US000001099H

United States Statutory Invention Registration [19]

[11] Reg. Number: H1099

Sayler

[43] Published: Sep. 1, 1992

[54] LIQUID-DROP GENERATOR

[75] Inventor: William M. Sayler, Bradshaw, Md.

[73] Assignee: The United States of America as represented by the Secretary of the Army, Washington, D.C.

[21] Appl. No.: 746,689

[22] Filed: Aug. 13, 1991

[51] Int. Cl.[5] ..... B65D 47/18

[52] U.S. Cl. ..... 222/420

*Primary Examiner*—Michael J. Carone

*Attorney, Agent, or Firm*—Anthony T. Lane; Edward Goldberg; Michael Sachs

[57] ABSTRACT

A liquid-drop generator providing discrete stringerless drops of simulants for use in testing chemical warfare detectors. The generator system is provided with two syringes in which one contains a highly viscous, non-newtonian liquid and the other contains water. The two syringes communicate with a capillary. When a pendant drop of non-newtonian liquid is formed on the terminal end of the capillary, the ejection of water or air into the capillary frees a discrete stringerless droplet from the terminal end thereof.

5 Claims, 1 Drawing Sheet

Figure 1:
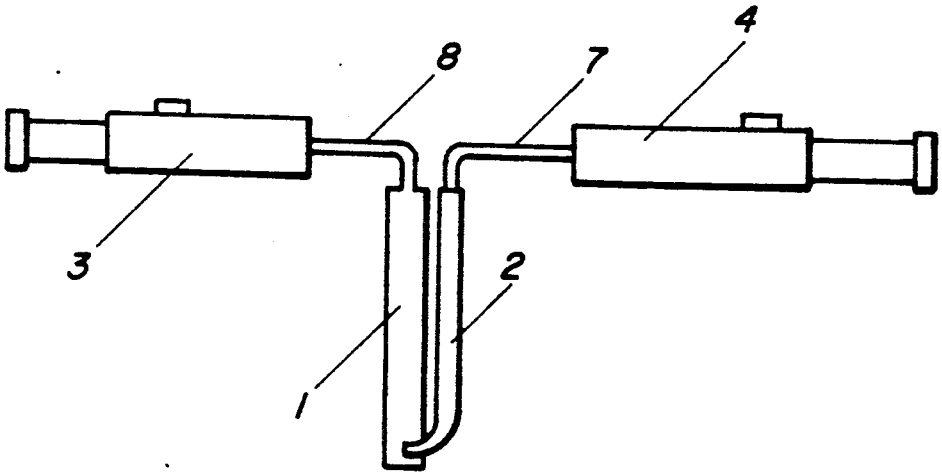

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIQUID-DROP GENERATOR

GOVERNMENTAL INTEREST

The invention described herein may be manufactured, used and licensed by or for the Government for Governmental purposes without payment to me of any royalties thereon.

RELATED CASE

This case is related to application Ser. No. 06/900,917 filed Aug. 26, 1986 (now abandoned), by William M. Sayler, for An Improved Liquid Drop Generator.

FIELD OF USE

This invention relates to a laboratory apparatus for use in generating a clean droplet of a highly viscous, non-newtonian liquid.

BACKGROUND OF THE INVENTION

There are many systems which are utilized for the detection of chemical warfare agents, some systems of which depend upon the impingement of liquid droplets against a detection surface for the measurement of the amount of chemical agent present in the environment. All such systems have a need for periodic testing of efficiency or effectiveness during their storage life. As a result of these requirements, the testing of the various systems is accomplished with the agents themselves. However, many of the agents are non-newtonian liquids which during droplet formation tend to have stringers or tend to form irregular size micro-drops, and these can cause inaccurate readings relative to the quantitative measurements.

The generation of discrete stringerless drops for the aforesaid test is extremely difficult when using high-viscosity, non-newtonian liquids. These liquids tend to form ligaments or stringers in the formation of the droplet. The ligaments tend to cause the drop to change its direction of flight, and sometimes are accompanies by unwanted droplets of a satellite nature. The complexity of the operation is further enlarged by the elastic properties and surface tension of the non-newtonian liquids when attempting to form microsize drops having diameters of less than about 1 mm. Many liquid-drop generators of the art have been evaluated with very limited success using high viscosity, non-newtonian liquids.

The art has provided the following devices for the production of liquid-droplets, viz: a spinning disc, a vibrating reed, a vibrating orifice, and air spray nozzle, and a pendant liquid-drop generator. However, all of the droplets produced by the foregoing art using highly viscous, non-newtonian fluids had stringers.

What is needed in the art is a liquid-drop generator for use in producing a liquid-drop from a high viscous non-newtonian fluid, on a reproducable basis, having a diameter between 0.5 and 5.0 mm of consistent geometry without stringers or ligaments.

SUMMARY OF THE INVENTION

It is an object of this invention to provide a liquid-drop generator which answers all the needs of the art as heretofore described.

Other objects and many attendant advantages of the present invention will be better understood from a reading of the following detailed description of this invention when taken with the accompanying drawing wherein:

FIG. 1 is a view showing the apparatus of this invention.

Referring to the figure, a microliter liquid dispensing syringe 3 is shown which is filled with a highly viscous, non-newtonian liquid. A capillary 1 is connected to the syringe 3 by means of a feed line 8. A second microliter syringe 4 is connected to hypodermic needle 2 by means of feed line 7. The hypodermic needle 2 is inserted into the capillary at a point adjacent the terminal portion of the exit port of the capillary 1. The second syringe 4 is filled with a fluid such as water or air. This is basically the entire system for the production of liquid drops of this invention.

In operation, the system is initially purged. Syringe 4 which is filled with a fluid such as water or air is subjected to repeating strokes forcing the fluid column through the feed line 7 to hypodermic needle 2 until the fluid enters the capillary. Syringe 3 which is filled with a highly viscous, non-newtonian liquid is subjected to repeating strokes until the feed line 8 and capillary is filled with the non-newtonion liquid. This will force out any water in the capillary. The stroking of the syringe is continued until drops have formed at the terminal end of the bottom of the capillary, and have fallen off. At this point, the capillary 1 is ready to produce drops.

The system operates by creating a ball of high viscosity, non-newtonian liquid at the end of the capillary 1 using microliter syringe 3, and then separating the drop from the source of the non-newtonian liquid in the capillary by injecting water or gas into the capillary adjacent the drop by stroking microliter syringe 4.

It should be noted that the system operates to form a drop of desired size by controlling the size of the capillary and the volume of the syringe 3. The capillary should have an inside diameter of 0.094 inch to produce a drop having a diameter of 3 mm. Also, a syringe having a volume of 500 ml has been found adequate for this purpose.

In use, the system described is placed at the end of a vertical wind tunnel operating at 30 fps. The syringes utilized were the Hamilton #750 microliter syringe of a 500 ul volume having a #27 hypodermic needle. The system generated clean drops and they were accelerated by the wind to a terminal velocity of 27 fps, before impacting on test cards. As recorded, the drop size was 3 mm, and drop velocity was 27 fps. The liquid drops were formed using diethylmalonate thickened with 5% by weight of a copolymer of 80% polymethyl methacrylate and 20% ethyl butyl acrylate.

In theory: the drops are formed by pumping or stroking a repeating syringe until a pendant drop is formed at the end of a capillary and is held in place by the elasticity of the liquid, and the surface tension of the liquid to the needle. The size of the drop is controlled by the diameter of the needle and the injection of the fluid by the second hypodermic needle.

The injecting of water into the capillary at a point near the terminal end thereof, to separate the pendant drop from the rest of the fluid was quite successful. This allowed the drop to fall free without any stringers. Further, air may be used instead of water as the injection fluid, in such case, the drops are clean and there is no need for water.

In conclusion, the cited highly viscous, non-newtonian liquid of 10 poise viscosity, which was tested, is considered to be the worst type of non-newtonian simulant to use. Yet, successful results were repeatedly achieved. Further, newtonian liquids and less viscous non-newtonian liquids could be used without encountering any of the difficulties of the art. It is believed that the elongational viscosity of the liquid produce stringers when drops are formed, so if a less viscous fluid was tested, the drops would be formed without any stringers. As long as the injection fluid, i.e. water in this case, does not wet all of the simulant in the capillary, the system will perform successfully.

The advantages of this system are that a clean liquid-drop of high viscosity, non-newtonian fluid may be produced by this system. The liquid-drop produced by the present system is free of all types of ligaments or stringers. Also, the size of the liquid-drop can be controlled in the range of diameters between 1.0 and 5.0 mm. Further, the liquid drops of a consistent reproducible geometry can be accelerated to a terminal velocity in 1 to 2 feet for impactment against test-cards.

What is claimed is:

1. A liquid-drop generator comprising:

a first syringe containing a highly viscous, non-newtonian liquid, a capillary having an upper and lower terminal end, a feed-tube connecting said syringe to said upper end of said capillary, a second syringe containing water, a hypodermic needle penetrating said capillary adjacent said lower terminal end, a second feed tube connecting said second syringe to said hypodermic needle, whereby said first syringe ejects said non-newtonian fluid into said capillary until a pendant drop is formed at said lower terminal end, and said second syringe ejects water into said capillary to free said droplet from said capillary.

2. The generator of claim 1 wherein said water is replaced by air.

3. The generator of claim 1 wherein said non-newtonian fluid has a viscosity of 10 poise.

4. The generator of claim 1 wherein said hypodermic needle penetrates said capillary at about 0.062 inches from the lower terminal end thereof.

5. The generator of claim 1 wherein said capillary has an inside diameter between about 0.094 and 0.125 inches.

* * * * *